Dec. 25, 1951        A. GAZDA        2,580,012
WATER FILTERING AND SEDIMENT REMOVING DEVICE
Filed July 28, 1947
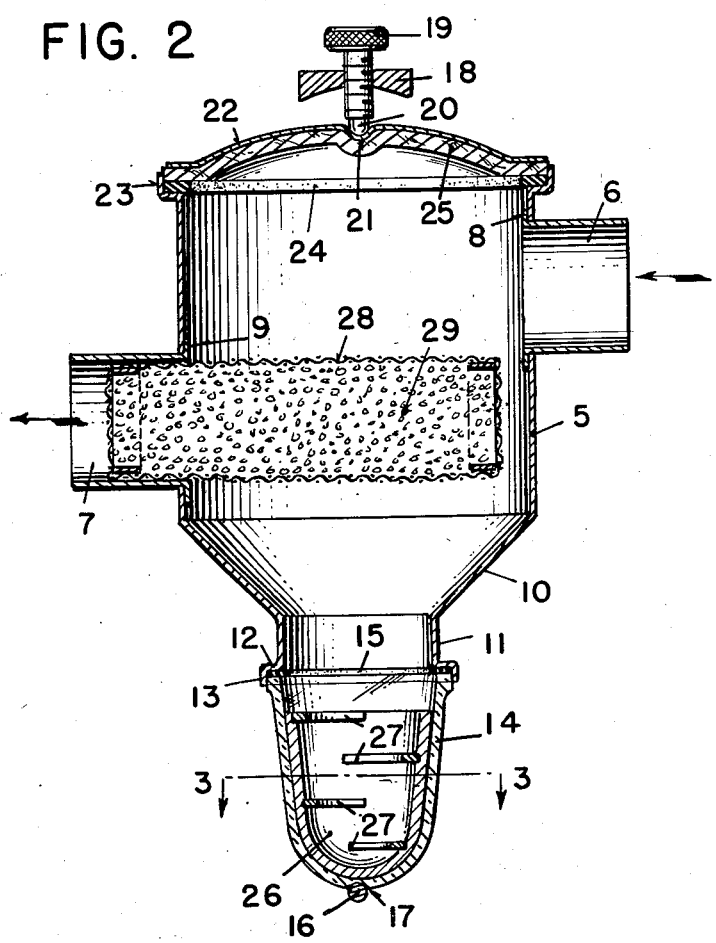
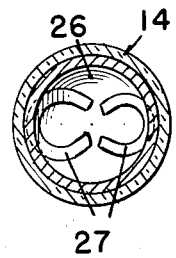
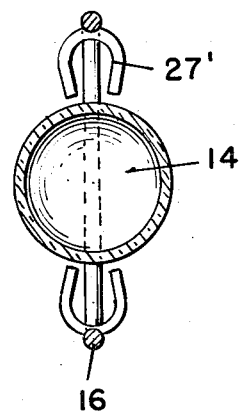
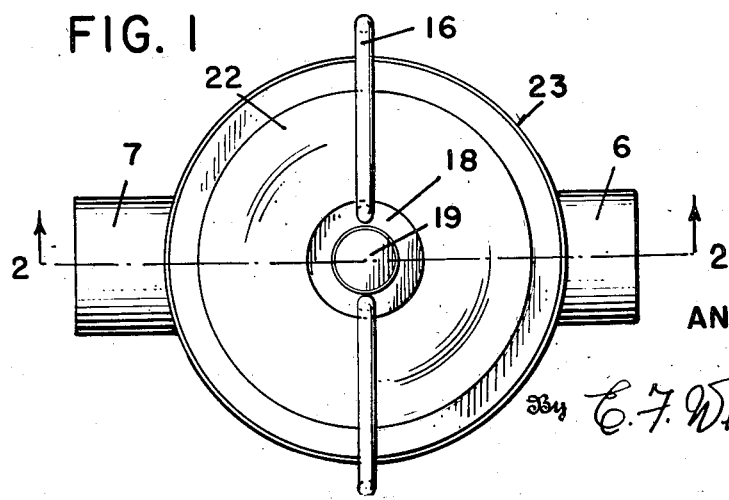
Inventor
ANTOINE GAZDA,
By E. F. Wenderoth
Attorney Patented Dec. 25, 1951

2,580,012

UNITED STATES PATENT OFFICE 2,580,012

WATER FILTERING AND SEDIMENT REMOVING DEVICE

Antoine Gazda, Providence, R. I.

Application July 28, 1947, Serial No. 764,154

4 Claims. (Cl. 210—43)

The present invention relates to a water filtering and cleaning device designed particularly for use with water cooled internal combustion engines.

An object of the invention is to remove from the water used for cooling an internal combustion engine the rust, grease and other sediments which such water accumulates or contains ab initio and thereby aid in preventing overheating of the engine, blocking and clogging of radiator tubes and increased fuel consumption.

A further object is to reduce deposition of sediment throughout the cooling system so that cooling is maintained substantially constant with an increase in efficiency of the engine.

A still further object is to provide water softening means for the cooling water if such is deemed desirable.

Other objects will appear from the detailed description which follows when considered in connection with the accompanying drawings, in which:

Fig. 1 is a plan view of the device which may be inserted at any appropriate position in the water circulation system of an internal combustion engine.

Fig. 2 is a cross-sectional view taken on section line 2—2 of Fig. 1.

Fig. 3 is a cross-sectional view taken on section line 3—3 of Fig. 2, and

Fig. 4 is a view similar to Fig. 3 of a modified construction.

In the drawings, in which similar reference characters indicate like parts in the various views, the water filtering and cleaning device comprises a container 5 having an inlet 6 for the water and an outlet 7 preferably located slightly below the inlet 6. The inlet 6 consists of a short metallic tube having a flange 8 which may be welded to the container 5 or secured thereto in any other watertight manner. The outlet 7 is provided with a flange 9 which may be similarly secured to the container.

The container 5 is shown as cylindrical and has at its lower portion a funnel shaped portion 10 terminating in another cylindrical portion 11 which is provided at its lower end with an outwardly extending flange 12 and a downwardly extending flange 13 so as to form a cup shaped abutment in which the upper end of the sediment trap 14 may be located. A washer 15 is interposed between the trap 14 and the flange 12 of the container 5 and a bail 16 seats in a groove 17 at the bottom of the trap 14 for detachably maintaining the trap 14 connected to the container 5.

The bail 16 extends upon each side of the container 5 preferably at right angles to the inlet and outlet pipes 6 and 7 and the ends thereof are secured to a threaded nut 18 with which a knurled adjusting screw 19 cooperates.

The adjusting screw 19 terminates at its bottom portion in a rounded non-threaded portion 20 which seats in a recess 21 provided in the cover 22 for the container 5.

Interposed between the cover 22 and the flanged top construction 23 of the container 5 is a washer element 24 and a grease absorbing pad 25 which covers the entire under surface of the cover 22. When the adjusting screw 19 is threaded downwardly in the nut 18 the projection 20 bearing upon the cover 22 will force the cover and grease absorbing pad 25 into tight contact with the washer 24 and the container 5 thereby making a watertight connection with the container 5 at its lower opening. The assembly is such that both the cover 22 and the trap 14 may be easily removed for cleaning purposes and quickly reassembled.

The trap 14 is preferably constructed of transparent material such as glass so that the condition thereof may be visually apparent. In the interior of the trap 14 there is located a holder element 26 which may be constructed of a plastic material or lead which supports one or more permanent magnets 27 of any desired shape but preferably of the shape shown.

In Fig. 4 a modification is disclosed wherein the permanent magnets 27' are located at the exterior of the trap 14 supported in any desired manner such as from bail 16.

A fine mesh filtering element 28 preferably constructed of copper wire and of cylindrical form is located within the container 5 and mounted at one end of the outlet tube 7. The filtering element 28 is constructed as a cartridge with both ends closed by the wire mesh so that zeolites 29 or any other water softening agency may be retained therein. Also the water softening agency may be omitted and in such case the end of the cartridge 28 may be opened at the end inserted in the outlet 7.

The operation of the device described above is as follows: When the construction has been inserted in the water system of an internal combustion engine preferably at a rubber hose line by inserting the inlet tube 6 and the outlet tube 7 into special cut hose line water will enter through the inlet 6 into the container 5. Before passing out through the outlet 7 such water will be filtered by the filtering elements 28 and will be acted upon by the water softening agency therein so that sediment and greases are removed and the water softened and the heavier elements will be deposited in the trap 14. The permanent magnets 27 and 27' associated with the trap 14 will materially assist in withdrawing rust elements from the water circulation system.

The magnets 27 and 27' may be eliminated if desired and in such case the removal of the heavier elements from the water circulation system will take place due to gravity alone. The positioning of the inlet 6 in offset relation to the outlet 7 causes the water passing through the cleaning and filtering device to set up a swirling action in the container 5 which assists materially in the cleaning operation.

As indicated above the water softening agency may be eliminated with or without an elimination of the permanent magnets and the cleaning and filtering operation will be quite efficient.

With the construction described the cooling of an internal combustion engine is materially improved and any elements which would tend to bring about overheating or inefficient operation of the engine are removed immediately from the water circulation system. The construction will extend the life of the water cooling system and at the same time bring about an improved operation and longer life for the internal combustion engine itself.

The filtering element 28 may also comprise porous tubes, screens, discs, and other forms of filtering elements now used.

Various modifications may be made in the construction described and all modifications are claimed which will fall within the spirit of the following claims.

I claim:

1. A water filtering and sediment removing device for water cooled internal combustion engines comprising a container having an inlet and an outlet to be connected in the water circulation system, said inlet and outlet being offset with respect to one another, a water filtering element in said container detachably secured to said outlet, a grease and oil absorbing element in said container and a sediment trap detachably secured to said container below said filtering and absorbing elements.

2. A water filtering and sediment removing device for water cooled internal combustion engines comprising a container having an inlet and an outlet offset with respect to one another to be connected in the water circulation system, a water filtering element in said container secured to said outlet, a grease and oil absorbing element in said container above said filtering element and a sediment trap having permanent magnets fixed thereto detachably secured to said container.

3. A water filtering and sediment removing device for water cooled internal combustion engines comprising a container having an inlet and an outlet to be connected in the water circulation system, said inlet and outlet being arranged in offsetting relation to one another, a filtering element secured to said outlet in said container, a transparent trap detachably secured to the bottom of said container, a cover for said container and an oil and grease absorbing element in said container adjacent said cover.

4. A water filtering and sediment removing device for water cooled internal combustion engines comprising a container having an inlet and an outlet to be connected in the water circulation system, a transparent trap detachably secured to the lower end of said container, a basket located within said trap and permanent magnets mounted upon said basket.

ANTOINE GAZDA.

REFERENCES CITED

The following references are of record in the file of this patent:

UNITED STATES PATENTS

| Number | Name | Date |
|---|---|---|
| 458,075 | Shelton | Aug. 18, 1891 |
| 854,738 | Hass | May 28, 1907 |
| 946,199 | Bowman et al. | Jan. 11, 1910 |
| 1,530,087 | MacArthur | Mar. 17, 1925 |
| 1,535,768 | Davis | Apr. 28, 1925 |
| 1,602,935 | Rasey | Oct. 12, 1926 |
| 1,658,040 | Cohn | Feb. 7, 1928 |
| 1,708,146 | Meyer | Apr. 9, 1929 |
| 1,715,492 | Bassion | June 4, 1929 |
| 1,768,550 | Fekete | July 1, 1930 |
| 1,778,910 | Niven | Oct. 21, 1930 |
| 1,857,606 | Rendelman | May 10, 1932 |
| 2,034,242 | Mautner | Mar. 17, 1936 |
| 2,095,407 | Baucom et al. | Oct. 12, 1937 |
| 2,117,273 | Brown | May 17, 1938 |
| 2,214,268 | Brooks | Sept. 10, 1940 |
| 2,244,574 | Rogers | June 3, 1941 |
| 2,345,029 | Brooks | Mar. 28, 1944 |
| 2,371,444 | Hubert | Mar. 13, 1945 |
| 2,405,838 | Lawson et al. | Aug. 13, 1946 |
| 2,437,221 | Cox et al. | Mar. 2, 1948 |

FOREIGN PATENTS

| Number | Country | Date |
|---|---|---|
| 272,784 | Great Britain | June 23, 1927 |